United States Patent
Davis et al.

(10) Patent No.: US 9,354,079 B2
(45) Date of Patent: May 31, 2016

(54) CONTROL MOMENT GYROSCOPES INCLUDING TORSIONALLY-STIFF SPOKED ROTORS AND METHODS FOR THE MANUFACTURE THEREOF

(75) Inventors: Porter Davis, Phoenix, AZ (US); Theodis Johnson, Litchfield Park, AZ (US); Carlos J. Stevens, Peoria, AZ (US)

(73) Assignee: Honeywell International Inc., Morris Plains, NJ (US)

(*) Notice: Subject to any disclaimer, the term of this patent is extended or adjusted under 35 U.S.C. 154(b) by 1201 days.

(21) Appl. No.: 13/476,699

(22) Filed: May 21, 2012

(65) Prior Publication Data

US 2014/0026688 A1   Jan. 30, 2014

(51) Int. Cl.
*G01C 19/06* (2006.01)
*G01C 25/00* (2006.01)
*B64G 1/28* (2006.01)

(52) U.S. Cl.
CPC .............. *G01C 25/00* (2013.01); *B64G 1/286* (2013.01); *G01C 19/06* (2013.01); *Y10T 29/49826* (2015.01); *Y10T 74/1282* (2015.01)

(58) Field of Classification Search
CPC .......... G01C 19/06; G01C 19/30; F16C 15/00
See application file for complete search history.

(56) References Cited

U.S. PATENT DOCUMENTS

| | | | |
|---|---|---|---|
| 1,426,339 A * | 8/1922 | Sperry | 74/574.4 |
| 2,075,797 A | 4/1937 | Blair | |
| 2,091,888 A | 8/1937 | Schmidt | |
| 2,244,603 A | 6/1941 | Bauer | |
| 2,413,285 A | 12/1946 | Bousky | |
| 2,940,318 A * | 6/1960 | Speen et al. | 74/5 R |
| 2,969,682 A | 1/1961 | Schoeppel et al. | |
| 3,242,742 A | 3/1966 | Parker | |
| 3,322,986 A | 5/1967 | Benatti et al. | |
| 3,664,199 A | 5/1972 | Lahde | |
| 3,702,568 A | 11/1972 | Howe | |
| 3,742,769 A | 7/1973 | Crutcher et al. | |

(Continued)

FOREIGN PATENT DOCUMENTS

| | | |
|---|---|---|
| EP | 2088080 A1 | 8/2009 |
| GB | 147271 | 7/1920 |

(Continued)

OTHER PUBLICATIONS

EP examination report for application No. EP 13 165 670.4 dated Oct. 19, 2013.

(Continued)

*Primary Examiner* — Terence Boes
(74) *Attorney, Agent, or Firm* — Ingrassia Fisher & Lorenz, P.C.

(57) ABSTRACT

Embodiments of control moment gyroscopes (CMGs) are provided, as are embodiments of a method for fabricating CMGs. In one embodiment, a CMG includes a stator housing, an inner gimbal assembly (IGA), and a torque motor coupled to the stator housing and configured to rotate the IGA about a gimbal axis to selectively generate a desired output torque during operation of the CMG. The IGA includes, in turn, an IGA support structure rotatably coupled to the stator housing, a monolithic CMG rotor rotatably mounted to the IGA support structure, and a spin motor coupled to the IGA support structure and configured to rotate the monolithic CMG rotor about a spin axis.

19 Claims, 5 Drawing Sheets

(56) References Cited

U.S. PATENT DOCUMENTS

| | | |
|---|---|---|
| 3,880,606 A | 4/1975 | Boltinghouse et al. |
| 4,030,371 A | 6/1977 | Bulman et al. |
| 4,257,280 A | 3/1981 | Coles et al. |
| 4,438,655 A | 3/1984 | Quermann |
| 4,487,083 A | 12/1984 | Quermann |
| 4,499,778 A | 2/1985 | Westhaver et al. |
| 4,618,791 A | 10/1986 | Morrill et al. |
| 4,644,793 A | 2/1987 | Church |
| 5,020,911 A | 6/1991 | Gauert et al. |
| 5,474,263 A | 12/1995 | Ford et al. |
| 5,535,902 A | 7/1996 | Greiff |
| 5,555,765 A | 9/1996 | Greiff |
| 5,650,568 A | 7/1997 | Greiff et al. |
| 5,723,923 A | 3/1998 | Clagett |
| 6,901,799 B2 | 6/2005 | Chen et al. |
| 7,000,308 B2 | 2/2006 | Fiske et al. |
| 7,314,225 B2 | 1/2008 | Murnen et al. |
| 2003/0140479 A1 | 7/2003 | Fiske et al. |
| 2007/0069081 A1 | 3/2007 | Roder et al. |
| 2010/0000349 A1* | 1/2010 | Stevens et al. .......... 74/5.4 |

FOREIGN PATENT DOCUMENTS

| | | |
|---|---|---|
| GB | 172557 | 12/1921 |
| GB | 418377 | 10/1934 |
| GB | 581891 | 10/1946 |
| GB | 838383 | 6/1960 |
| GB | 884061 A2 | 12/1961 |

OTHER PUBLICATIONS

EP Search Report for application No. EP 13 165 670.4 dated Sep. 27, 2013.

Hind, C.; Hind Musical Instruments; http://hindocarina.com/about/gyroscope, Feb. 20, 212.

Davis, P.; Momentum System Concepts and Trades for the New Class of Smaller Lower Cost Satellites, AAS 06-023, Feb. 4-8, 2006, Breckenridge, CO.

USPTO Notice of Allowance, Notification date Nov. 5, 2014; U.S. Appl. No. 13/476,737.

* cited by examiner

CONTROL MOMENT GYROSCOPES INCLUDING TORSIONALLY-STIFF SPOKED ROTORS AND METHODS FOR THE MANUFACTURE THEREOF

TECHNICAL FIELD

The present invention relates generally to control moment gyroscopes and, more particularly, to control moment gyroscopes including torsionally-stiff spoked rotors, as well as to methods for the manufacture thereof.

BACKGROUND

Control moment gyroscopes (CMGs) are commonly employed in satellite attitude control systems. A generalized CMG may include a main CMG housing and an inner gimbal assembly (IGA), which is mounted within the main CMG housing for rotation about a gimbal axis. The IGA includes, amongst other components, a rotor assembly, at least one spin motor, and a rotor support structure. In one known design commonly referred to as a "shell rotor architecture" or, more simply, a "shell rotor," the rotor assembly includes an annular rotor rim disposed between first and second hemi-spherical rotor shell pieces. The rotor rim is welded to the first and second rotor shell pieces along first and second circumferential rim-shell weld joints, respectively. Collectively, the rotor rim, the first rotor shell piece, and the second rotor shell piece form a generally spherical body having a central channel through which a rotor shaft extends. During operation, the spin motor rotates the rotor assembly about a spin axis at a relatively high rate of speed. The IGA is, in turn, selectively rotated about the gimbal axis, which is generally perpendicular to the rotor spin axis, by an actuator (e.g., a torque module assembly) mounted within the main CMG housing. When the IGA is "gimbaled" in this manner, a controlled torque is generated about an output axis normal to the spin and gimbal axes due to momentum transfer of the rotor assembly. This gyroscopic torque is imparted to the host satellite through a CMG mount interface, such as an annular flange bolted to the exterior of the satellite. By selectively rotating the IGA about the gimbal axis, the satellite's attitude may be adjusted and re-adjusted, as needed, in a highly controlled manner.

CMG shell rotors of the type described above have been developed and commercially implemented with considerable success by the assignee of the present Application, Honeywell International Inc. In general, CMG shell rotors provide superior performance characteristics as compared to other conventionally-known CMG rotors, including superior momentum-per-weight ratios and relatively high operational speed limits, as well as high angular stiffness. However, further improvements in momentum-per-weight ratios, speed capabilities, and other measures of CMG performance (e.g., operational lifespan) are still desirable. Moreover, as a notable disadvantage, the manufacturing schedule and costs associated with manufacture of CMGs having shell rotor-based architectures tend to be substantial. It is not uncommon for commercial production of a shell rotor to cost upwards of several hundred thousand U.S. dollars and to require over one year to complete.

It is thus desirable to provide CMGs including advanced rotors having improved performance characteristics (e.g., increased momentum-per-weight ratios, higher speed limits, longer operational lifespans, and so on) as compared to shell rotor assemblies and other conventionally-known CMG rotor assemblies. Ideally, embodiments of such a CMG, and specifically embodiments of the advanced rotor included within the CMG, would be amenable to production utilizing cost effective and time efficient manufacturing processes. It would also be desirable to provide manufacturing processes for producing CMGs including such high performance rotors. Other desirable features and characteristics of the present invention will become apparent from the subsequent Detailed Description and the appended claims, taken in conjunction with the accompanying drawings and this Background.

BRIEF SUMMARY

Embodiments of control moment gyroscopes (CMGs) are provided. In one embodiment, a CMG includes a stator housing, an inner gimbal assembly (IGA), and a torque motor coupled to the stator housing and configured to rotate the IGA about a gimbal axis to selectively generate a desired output torque during operation of the CMG. The IGA includes, in turn, an IGA support structure rotatably coupled to the stator housing, a monolithic CMG rotor rotatably mounted to the IGA support structure, and a spin motor coupled to the IGA support structure and configured to rotate the monolithic CMG rotor about a spin axis.

Methods for manufacturing a control moment gyroscope (CMG) are further provided. In one embodiment, the method includes the steps of producing a one piece rotor preform; machining the one piece rotor preform to define a monolithic CMG rotor; and installing the monolithic CMG rotor within an inner gimbal assembly (IGA), which includes an IGA support structure and a spin motor configured to rotate the monolithic CMG rotor relative to the IGA support structure about a spin axis. The IGA is then mounted to a stator assembly including a stator assembly housing and a torque motor configured to selectively rotate the IGA about a gimbal axis to selectively generate a desired output torque during operation of the CMG.

BRIEF DESCRIPTION OF THE DRAWINGS

At least one example of the present invention will hereinafter be described in conjunction with the following figures, wherein like numerals denote like elements, and.

For simplicity and clarity of illustration, the drawing figures illustrate the general manner of construction. Elements in the drawings figures are not necessarily drawn to scale. For example, the dimensions of some of the elements or regions in the figures may be exaggerated relative to other elements or regions to help improve understanding of embodiments of the invention. Descriptions and illustrations of well-known features and techniques may be omitted to avoid unnecessarily obscuring the invention.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

Figure 1:
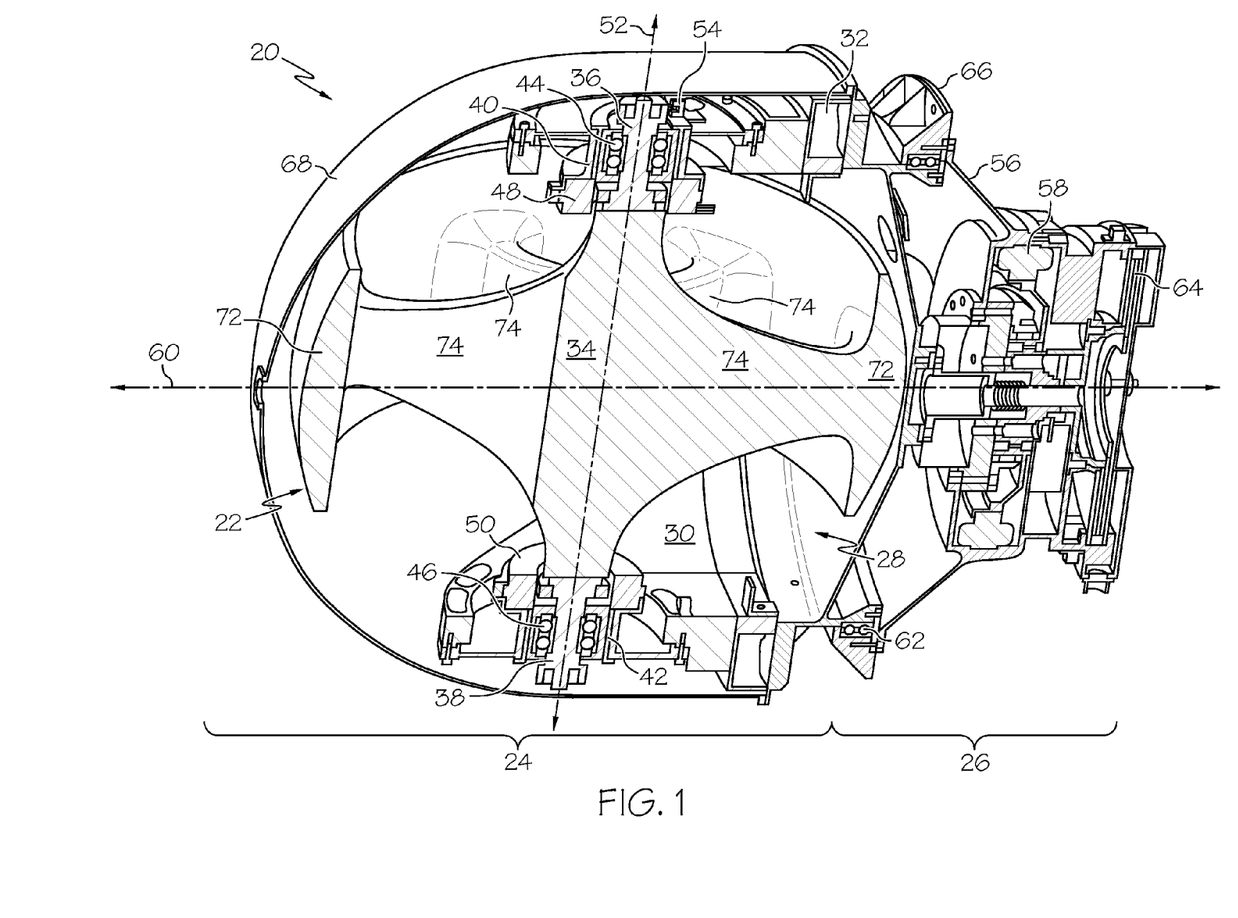
FIG. 1 is cross-sectional view of a control moment gyroscope including a high performance monolithic CMG rotor illustrated in accordance with an exemplary embodiment of the present invention.

FIG. 1 is cross-sectional view of a control moment gyroscope (CMG) 20 including a high performance rotor 22 illustrated in accordance with an exemplary of the present invention. Rotor 22 is advantageously, although not necessarily, fabricated as a monolithic or unitary piece and will consequently be referred to as "monolithic CMG rotor 22" herein. Such a unitary or monolithic construction enables CMG rotor 22 to be produced with exceptional structural integrity due, at least in part, to the elimination of weld joints, which tend to fatigue at high torque duty cycles and prematurely limit the rotor's operational lifespan. The elimination of such weld joints or other mechanical attachment points thus allows monolithic CMG rotor 22 to operate at higher rotational speeds and greater torque loads thereby enhancing the performance aspects of CMG 20 (e.g., higher momentum-to-weight ratios), while reducing stress concentrations, overall mechanical fatigue, and increasing the rotor's operational longevity. Improvements in momentum-to-weight ratios and other measures of CMG performance are also achieved by fabricating CMG rotor 22 to include a number of radially-extending rotor spokes having high angular or torsional stiffness, as described more fully below. As a still further advantage, monolithic CMG rotor 22, and thus CMG 20 as a whole, can be fabricated in a cost effective and relatively timely manner. Monolithic CMG rotor 22 is described in detail below in conjunction with FIGS. 2-4 and an exemplary method for manufacturing CMG rotor 22 is described below in conjunction with FIG. 5. First, however, a general discussion of CMG 20 is provided to establish an exemplary, albeit non-limiting context in which exemplary CMG rotor 22 can be better understood.

Referring to the exemplary embodiment illustrated in FIG. 1, CMG 20 is comprised of two main assemblies, namely, an inner gimbal assembly (IGA) 24 and a stator assembly 26. Monolithic CMG rotor 22 is contained within IGA 24, which further includes a rotor support structure 28 to which CMG rotor 22 is rotatably mounted. Rotor support structure 28 can comprise any structural element or assemblage of structure elements suitable for supporting rotor 22 during CMG operation. In the illustrated example, rotor support structure 28 includes yoke or saddle structure 30, which is bolted or otherwise affixed to a base ring assembly 32. Base ring assembly 32 is, in turn, mounted to the housing of stator assembly 26 such that base ring assembly 32, and thus IGA 24 as a whole, can rotate with respect to stator assembly 26 about a gimbal axis 60. As will be described more fully below in conjunction with FIGS. 2-4, monolithic CMG rotor 22 is fabricated to include a rotor shaft 34 having a fixed end 36 (the upper end of rotor shaft 34 in the orientation shown in FIG. 1) and an opposing floating end 38 (the lower end of shaft 34 in the illustrated orientation). Fixed end 36 of rotor shaft 34 is received within a first cylindrical cavity or annulus 40 provided within rotor support structure 28 and, specifically, within a first arm of saddle structure 30; while floating end 38 is received within a second annulus 42 provided within the opposing arm of saddle structure 30.

To facilitate high speed rotation of monolithic CMG rotor 22, a first spin bearing 44 (e.g., a fixed duplex bearing cartridge) is disposed within annulus 40 and positioned around fixed end 36 of rotor shaft 34. Similarly, a second spin bearing 46 (e.g., a floating duplex bearing cartridge) is disposed within annulus 42 and positioned around floating end 38 of rotor shaft 34. First and second spin motors 48 and 50 are further disposed around opposing ends of rotor shaft 34 (i.e., fixed end 36 and floating end 38, respectively) in a so-called "dual spin motor configuration." When energized, spin motors 48 and 50 rotate monolithic CMG rotor 22 about a spin axis (represented in FIG. 1 by dashed line 52) at a relatively high rate of speed, which may approach or exceed about 10,000 revolutions per minute, in an example. IGA 24 may further include various other components that are standard in the industry and not described in detail herein in the interests of concision, such as one or more heaters, vent valves, rotational sensors, and the like. For example, as illustrated in FIG. 1, IGA 24 may further be equipped with a tachometer assembly including a circuit card and an optical chopper 54 to monitor the rotational rate and/or the angular position of monolithic CMG rotor 22 during operation of CMG 20.

With continued reference to FIG. 1, stator assembly 26 includes a stator assembly housing 56 and a torque motor 58, which may be implemented as a torque module assembly. Stator assembly housing 56 supports rotor support structure 28 and, more generally, IGA 24. During the operation of CMG 20, torque motor 58 selectively rotates IGA 24 about a gimbal axis (represented in FIG. 1 by dashed line 60) orthogonal to spin axis 52. A gimbal bearing 62 (e.g., a large-bore duplex bearing) is disposed between stator assembly housing 56 and rotor support structure 28 to minimize friction as IGA 24 is rotated about gimbal axis 60. To detect the rotational rate and/or angular position of IGA 24, CMG 20 may be equipped with one or more sensors, such as a tachometer, a resolver, or the like. For example, as partially shown in FIG. 1, an optical rotary encoder 64 may be disposed within stator assembly housing 56 to monitor the rate and/or position of IGA 24. Although not shown in FIG. 1, CMG 20 may also include a slip ring assembly or other device (commonly implemented as a signal module assembly) suitable for transmitting electrical signals and/or power from electrical components mounted to stator assembly 26 or deployed onboard the host vehicle (e.g., a power source), across a rotary interface, and to the electrical components integrated into IGA 24 (e.g., spin motors 48 and 50); however, a signal module assembly need not be included in all embodiments and may be excluded in implementations wherein IGA 24 has relatively limited angle of rotation.

To permit CMG 20 to be mounted to a spacecraft (e.g., a satellite), an aircraft, or other vehicle, a mounting interface 66 is provided on the exterior of stator assembly housing 56. Mounting interface 66 may comprise, for example, an annular structure having a plurality of bolt apertures therethrough that may be bolted directly onto the wall of the host vehicle or, instead, bolted to an intermediary mounting structure that is, in turn, mounted on the vehicle. As noted above, to impart a desired torque to the host vehicle, torque motor 58 selectively rotates IGA 24, and thus rotor 22, about gimbal axis 60. Monolithic CMG rotor 22 (and particularly rotor rim 72 described below) is of sufficient mass and is spun a sufficiently high rotational rate during CMG operation that movement of rotor 22 out of its plane of rotation induces significant gyroscopic torque about an output axis normal to both spin axis 52 and gimbal axis 60. This output torque is transmitted from CMG rotor 22; through spin bearings 44 and 46, rotor support structure 28, gimbal bearing 50, and stator assembly housing 56; and to mounting interface 66 to impart a desired gyroscopic torque to the host vehicle and thereby perform highly controllable attitude adjustments.

In the exemplary embodiment illustrated in FIG. 1, stator assembly 26 is shown to include an IGA cover 68, which sealingly encloses the other components of IGA 24 and monolithic CMG rotor 22. IGA cover 68 permits nearvacuum conditions to be created within stator assembly 26 during the ground testing of CMG 20. In addition, IGA cover 68 provides a radiation thermal path for dissipating heat from monolithic CMG rotor 22 and the other components of IGA 24 (e.g., spin bearings 44 and 46). In embodiments wherein CMG 20 is deployed onboard a spacecraft, and in certain other embodiments, CMG 20 may not include IGA cover 68. However, if provided, IGA cover 68 is not required to support any additional components of CMG 20; nor is IGA cover 68 required to provide a path for transmitting. Thus, IGA cover 68 may be designed to be relatively thin-walled and to have a perfect or near perfect hemi-spherical shape to minimize the overall volume and weight of CMG 20.

Figure 2:
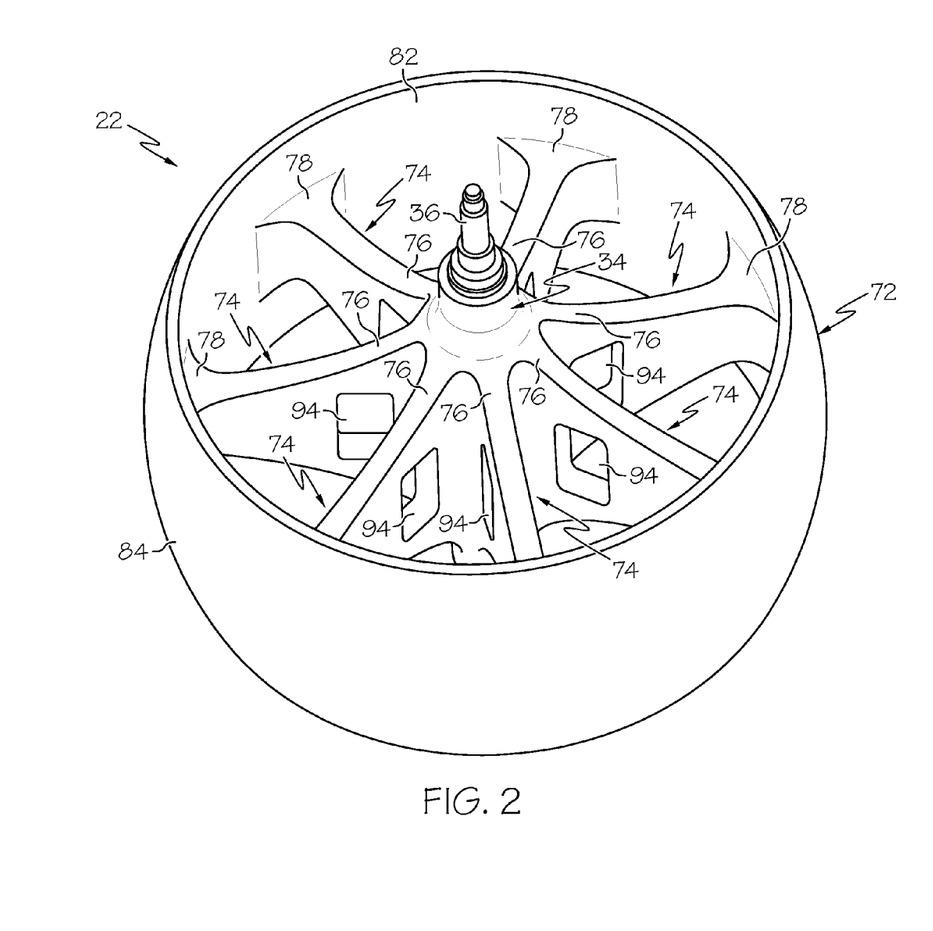
FIGS. 2 and 3 are isometric and top views, respectively, of the exemplary monolithic CMG rotor shown in FIG. 1.
Figure 3:
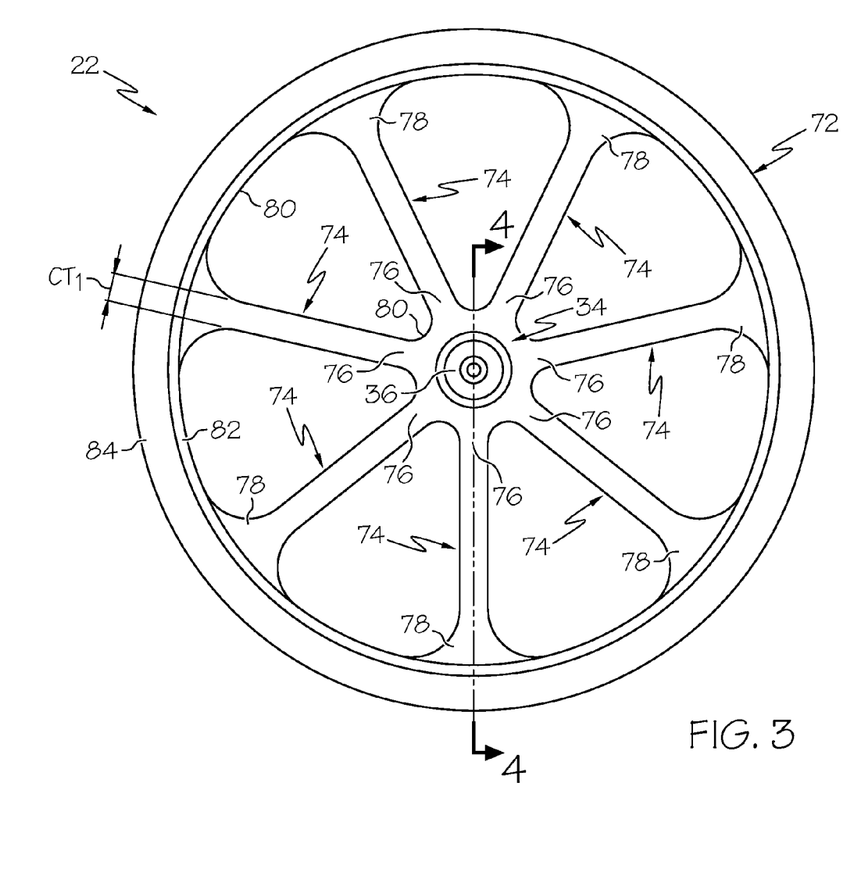

FIGS. 2 and 3 are isometric and top views, respectively, of monolithic CMG rotor 22. In addition to rotor shaft 34, monolithic CMG rotor 22 includes an inertial element or rotor rim 72 and a plurality of radially-extending spokes 74, which join rotor rim 72 to rotor shaft 34. Rotor spokes 74 extend along longitudinal axes generally residing in a plane containing gimbal axis 60 (identified in FIG. 1) and orthogonal to spin axis 52 (also identified in FIG. 1). Rotor spokes 74 are circumferentially- or angularly-spaced about spin axis 52 (FIG. 1) at substantially regular intervals; e.g., in the illustrate example wherein CMG rotor 22 includes seven rotor spokes, spokes 74 are spaced apart at intervals of approximately 51.4°. This example notwithstanding, it is emphasized that embodiments of monolithic CMG rotor 22 can include any practical number of spokes, whether the total number of spokes is even or odd. Each rotor spoke 74 includes an inner end 76 and an opposing outer end 78, which are joined to an outer circumferential surface 80 of rotor shaft 34 (identified in FIG. 3) and an inner circumferential surface 82 of rotor rim 72, respectively. As briefly indicated above, and as described more fully below in conjunction with FIG. 4, rotor spokes 74 are each fabricated to have a relatively high torsional stress capability and a high torsional stiffness, as taken about an axis perpendicular to spin axis 52 (FIG. 1), and are consequently referred to as "torsionally-stiff radial spokes 74" herein.

Rotor rim 72 can assume the form of any structural element, grouping, or assemblage of structural elements suitable for usage as the primary inertial mass of CMG rotor 22. As indicated in FIGS. 1-3, rotor rim 72 will typically assume the form of an annular body or monolithic ring. Rotor rim 72 includes an outer circumferential surface 84 having convex contour, which approximates the mid-region or equatorial band of a sphere to maximize the mass of rim 72 while providing CMG rotor 22 with a relatively compact envelope; however, the outer contours of rotor rim 72 may vary amongst embodiments. The outer diameter of rotor rim 72 will typically be determined by allowable stresses, operational rotor speeds, and rotor weight; while the inner diameter of rim 72 may be optimized to achieve a desired weight-to-momentum ratio. Increasing the radial thickness of rotor rim 72 will typically improve torque capacity and momentum capabilities of monolithic CMG rotor 22, but with a corresponding weight penalty.

In further embodiments, CMG 20 may be further equipped with a secondary or supplemental rim (not shown), which is affixed around rotor rim 72 during assembly. In a first example, the supplemental rim may be fabricated from a metal or alloy (e.g., a steel) as a one piece ring, which is mounted around rotor rim 72 utilizing an interference fit or thermal fit process. Alternatively, the supplemental rim can be fabricated from a composite material, such as a carbon fiber-composite, which is either pre-cured separately from CMG rotor 22 and then installed around rotor rim 72 or, instead, wrapped around rim 72 when in a malleable, pre-cured or green state and subsequently cured during the manufacturing process. In such cases, CMG rotor 22 may still be characterized by a monolithic construction when the structural elements of rotor 22 (i.e., rotor rim 72, rotor spokes 74, and rotor shaft 34) are integrally formed as a unitary body or single piece, as described more fully below. By mounting such a supplemental rim around monolithic CMG rotor 22, the supplemental rim can help to reduce operating stresses by placing rotor rim 72 in compression and/or by reinforcing the hoop strength of rotor rim. This, in turn, allows production of rotor assembly having operating stress capabilities, while still lacking weld joints that could otherwise undesirably limit rotational speeds and rotor lifespan.

As previously stated, CMG rotor 22 is preferably manufactured as a monolithic or unitary body or mass. In such cases, and with reference to the exemplary embodiment shown in FIGS. 1-3, rotor shaft 34, rotor rim 72, and radial spokes 74 are integrally joined as a single piece. This may be more fully appreciated by referring to FIG. 4, which is a cross-sectional view of monolithic CMG rotor 22 (partially shown) taken along line 4-4 in FIG. 3. With the understanding that the precise boundaries between integrally-joined regions or sections of a monolithic or single-piece part are somewhat conceptual in view of the monolithic construction of CMG rotor 22, dashed lines 86 are provided in FIG. 4 to visually distinguish the general boundaries or demarcation between rotor rim 72 and the outer terminal ends of radial spokes 74 (only one of which is fully shown in FIG. 4). Dashed lines 88 are further provided to visually distinguish the general demarcation between rotor shaft 34 and the inner terminal ends of radial spokes 74. Each radial spoke 74 has a predetermined length $L_1$, which is preferably greater than about half the radius of monolithic CMG rotor 22 (identified in FIG. 4 as "$R_1$").

Figure 4:
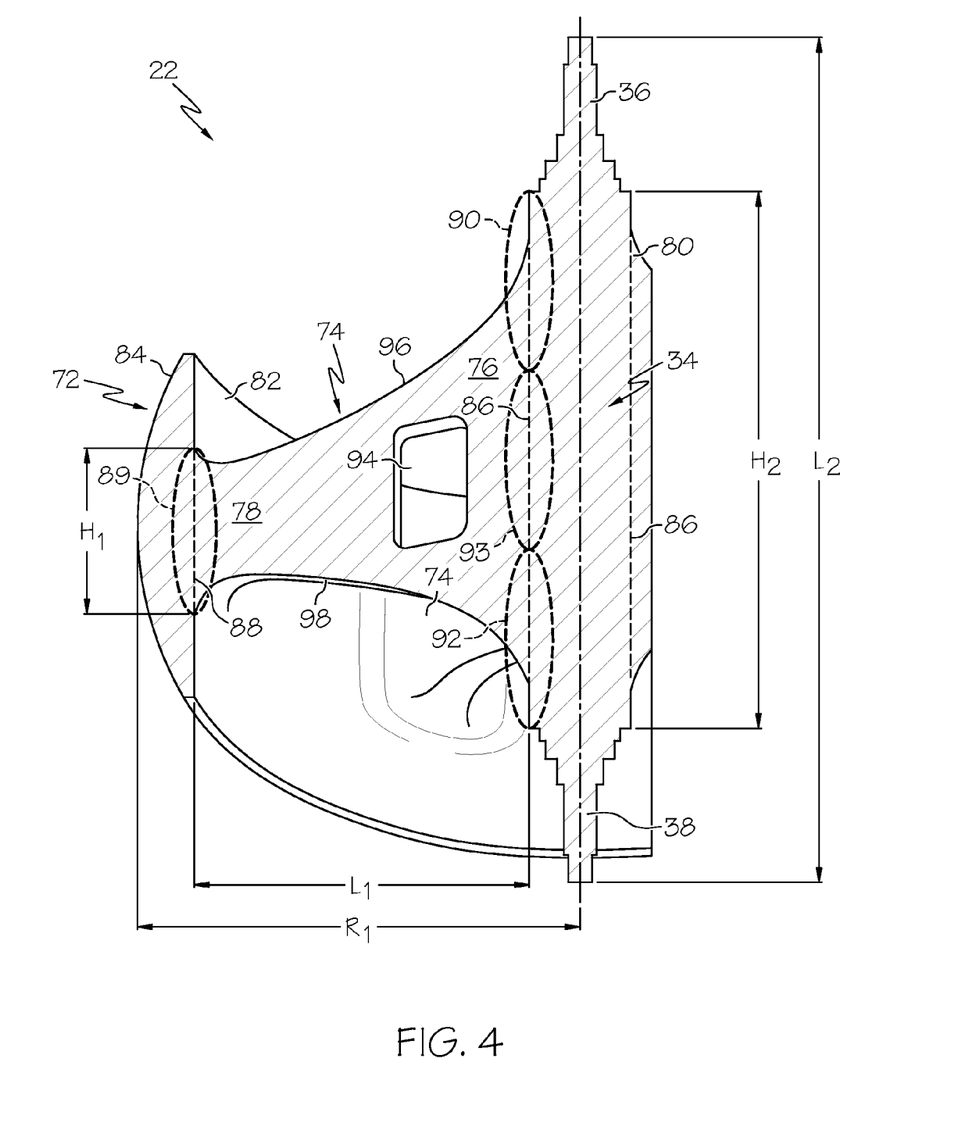
FIG. 4 is a cross-sectional view of a portion of the exemplary monolithic CMG rotor shown in FIGS. 1-3, as taken along line 4-4 in FIG. 3.

The region at which the outer spoke end 78 of each radial spoke 74 is integrally connected to inner circumferential surface 82 of rotor rim 72 is referred to herein as the "rim-spoke joinder interface" and generally identified in FIG. 4 by circle 89. While each radial spoke 74 may taper downward in axial height when moving from inner spoke end 76 to outer spoke end 78, as described below, the outermost end region of each outer spoke end 78 may be enlarged and, specifically, may increase gradually in height and width to provide a smooth transition at the rim-spoke joinder interface and thereby achieve a more uniform stress distribution at the rim-spoke joinder interfaces 89. As identified in FIG. 4 by double-headed arrow "$H_1$," outer spoke ends 78 are each fabricated to have a predetermined maximum height. By way of non-limiting example, as indicated in FIGS. 1-4, the axial height ($H_1$) of each outer spoke end 78 may be less than or equal to the axial height of rotor rim 72; however, this dimension is not critical and may be adjusted, within certain limits, to fine tune the cross-axis stiffness of radial spokes 74 or for other reasons.

With continued reference to FIG. 4, first and second circles generally identify first and second axially-spaced spoke-shaft joinder interfaces 90 and 92, respectively, along which opposing edge regions of inner spoke end 76 are joined to rotor shaft 34 (the edge regions of inner spoke end 76 being opposed as taken along the longitudinal axis of shaft 34 or spin axis 52, shown in FIG. 1). In one embodiment, spoke-shaft joinder interface 90 is located adjacent shaft end portion 36, while spoke-shaft joinder interface 92 is located adjacent shaft end portion 38. In another embodiment, spoke-shaft joinder interfaces 92 and 94 are located closer to the first and second opposing terminal ends, respectively, of shaft 34 than to gimbal axis 60 (FIG. 1). Thus, when CMG rotor 22 is installed within IGA 24 in the manner shown in FIG. 1, spoke-shaft joinder interface 90 resides adjacent spin motor 48 and fixed spin bearing 44; while spoke-shaft joinder interface 92 resides adjacent spin motor 50 and floating spin bearing 46. In the illustrated example, and as further indicated in FIG. 4 by circle 93, an intermediate portion of inner spoke end 76 likewise connects to an intermediate section of rotor shaft 34 such that inner spoke end 76 is integrally joined to rotor shaft 34 along the entire shaft height. It should be noted, however, that the below-described high torsional stiffness properties of rotor spokes 78 are primarily provided by wide stance of the opposing edge regions of inner spoke ends 76 and, specifically, by the axially-spaced disposition of spoke-shaft joinder interfaces 90 and 92. Intermediate spoke-shaft joinder interface 93 may thus be removed, in part or in its entirety, to provide additional mass reduction in further embodiments.

By forming spoke-shaft joinder interfaces 90 and 92 adjacent opposing shaft end portions 36 and 38, respectively, of rotor shaft 34, the axial height of inner spoke end 76 (identified in FIG. 4 as "$H_2$") is maximized to increase the angular stiffness of rotor spokes 74. It is generally impractical to impart each inner spoke end 76 with an axial height equivalent to the length of rotor shaft 34 (identified in FIG. 4 as "$L_2$") as the opposing terminal ends of shaft 34 must typically be left unencumbered to provide sufficient space to dispose at least two spin bearings (e.g., spin bearings 44 and 46, shown in FIG. 1) and one or more spin motors (e.g., spin motors 48 and 50, shown in FIG. 1) around the opposing shaft ends when rotor shaft 34 is installed within IGA 24 (FIG. 1). Inner spoke ends 76 are therefore preferably formed to have heights ($H_2$) as close as possible to the length ($L_2$) of rotor shaft 34, while accommodating the spin bearings and spin motor(s) in an embodiment. Thus, in certain implementations, each rotor spoke 74 is fabricated such that its inner spoke end 76 has an axial height ($H_2$) that is closer in magnitude to the length ($L_2$) of rotor shaft 34 than to the height ($H_1$) of its outer spoke end 78. In further embodiments, each inner spoke end 76 has an axial height ($H_2$) that is at least about one half the length ($L_2$) of rotor shaft 34. In still further embodiments, each inner spoke end 76 has an axial height ($H_2$) that is approximately equivalent to (that is, differs by no more than about 10% as compared to) the radius ($R_1$) of monolithic CMG rotor 22 (identified in FIG. 4 as "$R_1$"). Generally, the maximum height of inner spoke end 76 ($H_2$) will be greater than, and is preferably at least twice, the maximum height ($H_1$) of outer spoke end 78.

Each radial spoke 74 includes opposing longitudinal ridges or spines 96 and 98. As each radial spoke 74 increases in axial height when moving from its outer spoke end 78 to its inner spoke end 76, spines 96 and 98 diverge with increasing proximity to rotor shaft 34. Radial spokes 74 are preferably fabricated to each have an axially-tapered geometry providing a gradual or non-stepped increase in axial height when moving along the spoke length in a radially outward direction, although the possibly that spokes 74 are fabricated to have an axially-stepped shape is by no means excluded. For example, as shown in FIG. 4, opposing longitudinal ridges or spines 96 and 98 of each radial spoke 74 may each be imparted with a generally arc-shaped, sloped, or parabolic contour such that each spine 96, 98 gradually moves further away from gimbal axis 60 (FIG. 1) with increasing proximity toward rotor shaft 34. Notably, such an axially-tapered design reduces hub stresses during high speed CMG operation. Furthermore, by virtue of this tapered spoke height profile, opposing spoke spines 96 and 98 effectively function as constant stress beams. While spokes 74 have substantially constant chordal thicknesses (identified as "$CT_1$" in FIG. 3 and described more fully below) along their respective lengths in the illustrated example, it should be noted that the chordal thicknesses of radial spokes 74 may vary along the length of each spoke in alternative embodiments; e.g., in certain implementations, the chordal thickness of each radial spoke may be tapered in much the same manner as is the spoke height such that the chordal thickness gradually increases with increasing proximity to the rotor hub, rotor shaft 34, and spin axis 52 (FIG. 1).

Still further improvements in momentum-to-weight ratios may be realized by reducing the weight of CMG rotor 22 without negatively impacting the torsional stiffnesses of rotor spokes 74. The weight of CMG rotor 20 can be favorably reduced with little impact on spoke torsional stiffness by fabricating each rotor spoke 74 to have a relatively narrow transverse or chordal thickness (identified in FIG. 3 as "$CT_1$"); e.g., in certain embodiments and by way of non-limiting example, each rotor spoke 74 may be fabricated such that the maximum axial height ($H_1$) of each outer spoke end 78 is at least twice the radial spoke chordal thickness ($CT_1$), such that the average axial height of each rotor spoke 74 is at least twice the radial spoke chordal thickness ($CT_1$), and such that the maximum axial height ($H_2$) of each inner spoke end 76 is at least four times the radial spoke chordal thickness ($CT_1$). Furthermore, one or more concavities may be formed within each rotor spoke 74 or one or more transverse openings may be formed through each rotor spoke 74 to reduce spoke mass. For example, as shown in FIGS. 2 and 4, a lightening hole or window 94 may be cut or otherwise formed in the body of each rotor spoke 74 and located between spoke-shaft joinder regions 90 and 92, as taken along the longitudinal axis of rotor shaft 34 or spin axis 52 (FIG. 1). Each transverse window 94 is preferably formed through an intermediate portion of rotor spoke 74 and does not breach either of opposing spines 96 and 98 (labeled in FIG. 4) to maintain the structural integrity of spokes 74. While shown as having a rectangular planform geometry in the exemplary embodiment shown in FIGS. 2 and 4, each window 94 may assume various other geometries in further embodiments.

It should thus be appreciated that, by maximizing the height ($H_2$) of inner spoke end 76 relative to the length ($L_1$) of rotor shaft 34, and thus effectively locating spoke-shaft joinder interfaces 90 and 92 in close proximity to the opposing terminal ends of rotor shaft 34, the overall angular or torsional stiffnesses of rotor spokes 74 are significantly increased. Such a high torsional spoke stiffness allows monolithic CMG rotor 20 to be rotated at exceptionally rapid rotational rates while remaining highly responsive to torque applied by torque motor 58 and, therefore, highly controllable. Furthermore, by fabricating CMG rotor 22 to have a monolithic construction lacking weld joints or mechanical joinder interfaces, embodiments of CMG rotor 22 can achieve significantly improved stress capabilities. An exemplary method for manufacture CMG rotor 22 as a monolithic or one-piece body is described below in conjunction with FIG. 5.

Figure 5:
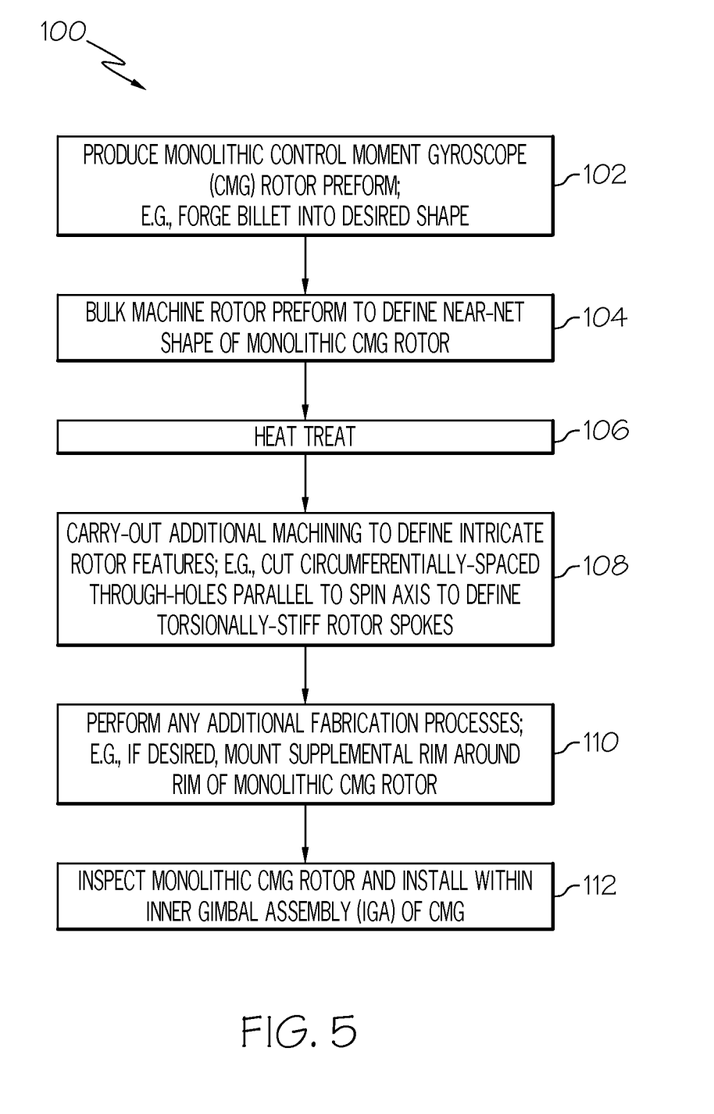
FIG. 5 is a flowchart illustrating an exemplary method for manufacturing a control moment gyroscope including a monolithic CMG rotor, such as CMG rotor shown in FIGS. 1-4.

FIG. 5 is a flowchart illustrating an exemplary method 100 for manufacturing a control moment gyroscope including a monolithic CMG rotor, such as CMG rotor 22 described above in conjunction with FIGS. 1-4. Exemplary method 100 commences with the step of producing a monolithic or one piece CMG rotor preform (STEP 102). In one embodiment, the monolithic rotor preform is fabricated by forging a single billet into a desired bulk shape, such as cylinder. The billet is preferably composed of a relatively dense alloy having high tensile and yield strengths, having moderate to good ductility, and having low life cycle fatigue properties. Suitable materials include, but are not limited to, high strength steels. Next, at STEP 104, the forging or one piece CMG rotor preform undergoes bulk machining during which large portions of the billet are removed to define the near-net shape of the finished monolithic CMG rotor. For example, during bulk machining, the upper and lower regions of the one piece CMG rotor preform may be removed to define the upper and lower ends of the rotor shaft, and the outer circumference of the CMG rotor preform may be rounded to define the outer geometry of the rotor rim. Heat treatment may then be carried-out (STEP 106), which may entail a hot isostatic pressing ("HIP") process and possibly one or more additional high temperature treatment steps.

Continuing with exemplary method 100 (FIG. 5), further machining of the near-net rotor preform may next be performed to define the more intricate features of the CMG rotor (STEP 108). For example, and with reference to CMG rotor 22 shown in FIGS. 1-4, circumferentially-spaced through holes may be cut through the body of the rotor preform along axes substantially parallel to the spin axis to define the lateral sidewalls of the plurality of torsionally-stiff radial spokes. In this manner, the plurality of torsionally-stiff radial spokes can be fabricated to each include an inner spoke end integrally joined to the rotor shaft and an outer spoke end integrally joined to an inner circumferential surface of the rotor rim. The radial spokes are fabricated to have a tapered axial height, which increases gradually with increasing proximity to the rotor shaft as previously described; and/or a tapered chordal thickness, which likewise increases with increasing proximity to the rotor shaft. Next, at STEP 110, one or more additional fabrication steps may be performed to complete fabrication of the monolithic CMG rotor, if needed. For example, in certain embodiments, a supplemental rim (e.g., a steel ring) may be mounted around the rim of the monolithic CMG rotor utilizing a thermal- or interference-fit, as previously described. The supplemental rim may also be fabricated from a composite material, which is either pre-cured and then installed around the rotor rim or, instead, wrapped around the rim of the monolithic CMG rotor in a green, pre-cured state and then cured in place during STEP 110. Finally, at STEP 112, the CMG rotor may be inspected and installed within the inner gimbal assembly of its host CMG. In one embodiment, inspection may entail a characterization process during which the CMG rotor is examined for structural defects utilizing X-ray radiography or another inspection technique. By fabricating CMG rotor 22 from a one piece preform (or a single forged billet) in the above-described manner, and thus eliminating the need for welding or otherwise joining multiple separately-fabricated components, the time and costs associated with manufacture of CMG rotor 22 can be significantly reduced as compared to the manufacture of shell rotors and other conventionally-known multi-piece rotors.

In view of the above, it should be appreciated that multiple exemplary embodiments of a control moment gyroscope including advanced rotors having improved performance characteristics (e.g., increased momentum-per-weight ratios, higher speed limits, longer operational lifespans, and so on) as compared to shell rotor assemblies and other conventionally-known CMG rotor assemblies. Embodiments of the above-described CMG employed monolithic CMG rotors, which are amenable to production utilizing cost effective and time efficient manufacturing processes. The foregoing has also provided manufacturing processes suitable for producing CMGs including such high performance rotors.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended claims.

What is claimed is:

1. A control moment gyroscope (CMG), comprising:
 a stator housing;
 an inner gimbal assembly (IGA), comprising:
  an IGA support structure rotatably coupled to the stator housing;
  a monolithic CMG rotor rotatably mounted to the IGA support structure; and
  a spin motor coupled to the IGA support structure and configured to rotate the monolithic CMG rotor about a spin axis; and
 a torque motor coupled to the stator housing and configured to rotate the IGA support structure about a gimbal axis to selectively generate a desired output torque during operation of the CMG;
 wherein the monolithic CMG rotor comprises a rotor rim, a rotor shaft, and a plurality of torsionally-stiff radial spokes integrally joined to the rotor rim and the rotor shaft as a single piece; and
 wherein each of the plurality of torsionally-stiff radial spokes is joined to the rotor shaft at a first spoke-shaft joinder interface and at a second spoke-shaft joinder interface, the first spoke-shaft joinder interface located closer to a first end of the rotor shaft than to the gimbal axis, and the second spoke-shaft joinder interface located closer to a second opposing end of the rotor shaft than to the gimbal axis.

2. A CMG according to claim 1 wherein the average axial height of each of the plurality of torsionally-stiff radial spokes is at least twice a chordal thickness thereof.

3. A CMG according to claim 1 wherein an axial height of the inner spoke end is closer in magnitude to the length of the rotor shaft than to an axial height of the outer spoke end.

4. A CMG according to claim 1 wherein the axial height of the inner spoke end is at least about one half the length of the rotor shaft.

5. A CMG according to claim 1 wherein the axial height of the inner spoke end is approximately equivalent to the radius of the monolithic CMG rotor.

6. A CMG according to claim 1 the CMG further comprises:
 a first spin bearing disposed around the first end of the rotor shaft at a location adjacent the first spoke-shaft joinder interface; and
 a second spin bearing disposed around the second, opposing end of the rotor shaft at a location adjacent the second spoke-shaft joinder interface.

7. A CMG according to claim 1 further comprising at least one cutout formed through the inner spoke end between the first spoke-shaft joinder interface and the second spoke-shaft joinder interface.

8. A CMG according to claim 1 wherein the maximum axial height of the inner spoke end is at least twice the maximum axial height of the outer spoke end.

9. A CMG according to claim 1 wherein the axial height of each torsionally-stiff radial spoke decreases gradually when moving in a radially outward direction from the inner spoke end toward the outer spoke end.

10. An CMG according to claim 1 wherein the rotor shaft, the rotor rim, and the plurality of torsionally-stiff radial spokes are produced from a one piece rotor preform through which a plurality of circumferentially-spaced openings is formed to define lateral sidewalls of the plurality of torsionally-stiff radial spokes.

11. A control moment gyroscope (CMG), comprising:
a stator housing;
an inner gimbal assembly (IGA), comprising:
an IGA support structure rotatably coupled to the stator housing;
a CMG rotor rotatably mounted to the IGA support structure for rotation about a spin axis, the CMG rotor comprising:
a rotor shaft;
a rotor rim; and
a plurality of torsionally-stiff radial spokes joining the rotor shaft to the rotor rim, each of the plurality of torsionally-stiff radial spokes increasing gradually in axial height when moving radially inward toward the spin axis, each of the plurality of torsionally-stiff radial spokes further having an average axial height at least twice a chordal thickness thereof;
a spin motor coupled to the IGA support structure and configured to rotate the monolithic CMG rotor about the spin axis; and
a torque motor coupled to the stator housing and configured to rotate the IGA support structure about a gimbal axis to selectively generate a desired output torque during operation of the CMG.

12. A CMG according to claim 11 wherein the rotor shaft has first and second longitudinally-opposed ends each integrally joined to the plurality of torsionally-stiff radial spokes.

13. A CMG according to claim 11 wherein the rotor shaft, the rotor rim, and the plurality of torsionally-stiff radial spokes are integrally joined as a single piece.

14. A CMG according to claim 11 wherein the rotor shaft, the rotor rim, and the plurality of torsionally-stiff radial spokes are produced from a one piece rotor preform through which a plurality of circumferentially-spaced openings is formed to define lateral sidewalls of the plurality of torsionally-stiff radial spokes.

15. An inner gimbal assembly (IGA) configured to be installed within a control moment gyroscope (CMG) having a stator housing, the IGA comprising:
an IGA support structure configured to be rotatably coupled to the stator housing when the IGA is installed within the CMG;
a monolithic CMG rotor rotatably mounted to the IGA support structure for rotation about a spin axis, the monolithic CMG rotor comprising:
a rotor shaft;
a rotor rim; and
a plurality of torsionally-stiff radial spokes joining the rotor shaft to the rotor rim;
wherein each of the plurality of torsionally-stiff radial spokes increases gradually in axial height when moving radially inward toward the spin axis; and
wherein each of the plurality of torsionally-stiff radial spokes has an average axial height at least twice a chordal thickness thereof.

16. An IGA according to claim 15 wherein the rotor shaft, the rotor rim, and the plurality of torsionally-stiff radial spokes are produced from a one piece rotor preform through which a plurality of circumferentially-spaced openings is formed to define lateral sidewalls of the plurality of torsionally-stiff radial spokes.

17. An IGA according to claim 15 wherein the rotor shaft has first and second opposing ends, and wherein each of the plurality of torsionally-stiff radial spokes is joined to the rotor shaft at a first spoke-shaft joinder interface adjacent the first end of the rotor shaft and at a second spoke-shaft joinder interface adjacent the second opposing end of the rotor shaft.

18. An IGA according to claim 17 further comprising a plurality of transverse openings each formed in one of the plurality of torsionally-stiff radial spokes at a location between the first and second spoke-shaft joinder interfaces, as taken along the spin axis.

19. An IGA according to claim 17 wherein the first and second spoke-shaft joinder interfaces are positioned adjacent first and second spin bearings included within the CMG when the IGA is installed therein.

* * * * *